United States Patent [19]

Endo et al.

[11] 4,327,188

[45] Apr. 27, 1982

[54] MULTICELLULAR MONOLITHIC CERAMIC BODY AND PREPARATION THEREOF

[75] Inventors: Yasuhiko Endo, Yokohama; Takashi Mimori, Takasago; Motohiro Gotō, Himeji, all of Japan

[73] Assignee: Asahi Glass Company, Ltd., Tokyo, Japan

[21] Appl. No.: 208,002

[22] Filed: Nov. 18, 1980

[30] Foreign Application Priority Data

Dec. 25, 1979 [JP] Japan .................. 54-167666

[51] Int. Cl.³ .................. C04B 35/44; C04B 35/46; C04B 35/50
[52] U.S. Cl. .................. 501/134; 264/56; 264/63; 264/177 R; 252/477 R
[58] Field of Search .......... 106/73.33, 40 R, 73.2; 252/477 R; 264/56, 177 R, 63; 501/134

[56] References Cited

U.S. PATENT DOCUMENTS

| | | | |
|---|---|---|---|
| 3,853,485 | 12/1974 | Hogan | 252/477 R |
| 3,885,977 | 5/1975 | Lachman et al. | 106/73.33 |
| 3,899,326 | 8/1975 | Frost et al. | 264/57 |
| 3,983,283 | 9/1976 | Bagley | 252/477 R |
| 4,118,240 | 10/1978 | Tahakatake | 106/73.33 |
| 4,194,917 | 3/1980 | Sakeim et al. | 106/73.33 |

*Primary Examiner*—Edward J. Meros
*Assistant Examiner*—Mark Bell
*Attorney, Agent, or Firm*—Oblon, Fisher, Spivak, McClelland & Maier

[57] ABSTRACT

A multicellular monolithic ceramic body having many gas passages partitioned by thin walls is made of aluminum titanate as a major cnstituent and has less than 0.15% of a thermal expansion coefficient at 1000° C. and higher than 350 kg./cm² of a compressive strength as zero of an open frontal area as the properties in the direction along the gas passages and more than 35% of a porosity.

20 Claims, No Drawings

MULTICELLULAR MONOLITHIC CERAMIC BODY AND PREPARATION THEREOF

BACKGROUND OF THE INVENTION

1. Field of the Invention

The present invention relates to a novel, useful multicellular monolithic ceramic body which is referred to as a ceramic honeycomb and a preparation thereof.

2. Description of the Prior Art

Discharge gas of internal combustion engines such as automotive emission contain noxious components such as carbon monoxide and hydrocarbons. The gas causes air pollution together with discharge gases from the other industrial apparatuses. In view of prevention of public pollution, it is necessary to convert the noxious components into non-noxious components. It has been considered that a catalyst device is one of the most effective devices.

As a catalyst for cleaning the automotive emission etc., it has been proposed to use a pellet or grain type catalyst or a multicellular monolithic catalyst having many gas passages partitioned by thin walls in one or two direction. The latter, multicellular monolithic ceramic body has remarkable advantages of low pressure loss of the emission gas, high wearing resistance under severe vibration and light weight and compact and has the improved durability. Therefore, the demand has been increased. However, the multicellular monolithic ceramic body has not enough thermal shock resistance in comparison with the pellets in view of the structure. Therefore, it is necessary to form it by a refractory ceramic having low thermal expansion and contraction and low expansion coefficient as the material. This fact is one of serious problem for using such ceramic honeycombs in this application.

As materials for the ceramic honeycombs, it has been proposed to use alumina-silica, alumina, zirconia-alumina, zirconia-magnesia, mullite, zirconia-silica (zircon), zircon-mullite, titania, magnesia-alumina spinel, zirconia and the other special non-oxide type ceramics such as $Si_3N_4$ and carbon. However, it has not been practically used except the following magnesia-alumina-silica ($2MgO.2Al_2O_3.5SiO_2$:cordierite), lithia-alumina-silica ($Li_2O.Al_2O_3._nSiO_2$; n:2–8, β-spodumene), because of high thermal expansion coefficient and the oxidative consumption at high temperature. It has been highly required to improve the catalyst in view of severe condition in applications. There is substantially not any hope for the improvement.

The cordierite has been widely used because of low expansion (thermal expansion coefficient of 0.12 to 0.3% at 1000° C.) and relatively high stability at high temperature (low decomposition) as the characteristics of ceramics.

The above-mentioned β-spodumene has the thermal expansion coefficient (−0.1 to −0.2% at 1000° C.) lower than that of cordierite. The temperature for the allowable application is too low as lower than 1200° C. In the practical condition requiring higher heat resistance, β-spondumene has not been practically used. In feature, there is substantially not possibility to use it.

The cordierite honeycombs have been practically used, however, they have certain disadvantages.

One is the requirement of higher heat resistance, because of improvement of engines, and instantaneous high temperature (caused by back-fire etc.) and long durability. The other is the requirement to large thermal shock resistance.

On the other hand, the following physical characteristics are required for the fabricated product as the ceramic honeycomb as a carrier for a catalyst. That is, high porosity is required for carrying the catalyst and high strength of the substrate is required because of the requirement of thinner walls of the ceramic honeycomb for effectively using the expensive catalyst. It is not easy to satisfy both characteristics in view of the balance that higher porosity results in lower strength. The problem has not been dissolved.

It has been studied to overcome all or most of the disadvantages of the conventional products and to develop an improved ceramic honeycomb and has been succeeded to develop a satisfactory ceramic honeycomb.

SUMMARY OF THE INVENTION

It is an object of the present invention to provide a novel, useful ceramic honeycomb having characteristics of high heat resistance, high porosity, high compressive strength and low thermal expansion coefficient which are suitable for cleaning the automotive emission and have not been attained.

The foregoing and other objects of the present invention have been attained by providing a multicellular monolithic ceramic body having many gas passages partitioned by thin walls which is made of aluminum titanate as a major constituent and has less than 0.15% of a thermal expansion coefficient at 1000° C. and higher than 350 kg./cm$^2$ of a compressive strength as zero of an open frontal area as the properties in the direction along the gas passages and more than 35% of a porosity.

The multicellular monolithic ceramic body can be prepared by fabricating a specific ceramic plastic composition by extruding it through a die.

DETAILED DESCRIPTION OF THE PREFERRED EMBODIMENTS

The multicellular monolithic ceramic body as the ceramic honeycomb and the applications will be illustrated in detail.

In the specification, the honeycomb means a fired body having honeycomb structure having many gas passages partitioned by thin walls. The cross-sectional shape of the gas passage perpendicular to the direction of the gas flow is not limited to hexagonal and can be octagonal, quadrilateral, trigonal or circular shape etc. The open frontal part, the size of the gas passage and the thickness of the thin wall will be described below.

The ceramic honeycomb of the present invention has been developed to be optimum as a catalyst carrier for cleaning automotive emission from the above-mentioned viewpoint. Thus, it can be also used for cleaning discharge gases from the other industrial apparatuses and for the other usages beside the catalyst carrier, for example, carriers for heat exchange, burner tile, radiation walls, heaters, thermal reactors, filters, heat insulators and orifices for hot fluid.

The chemical composition of the fired ceramic of the multicellular monolithic ceramic body as the ceramic honeycomb of the present invention is made of aluminum titanate ($Al_2O_3.TiO_2$) as the major component to have the specific characteristics of the substrate.

The required characteristics of the substrate are not easily given. Aluminum titanate selected as the substrate of the present invention should be also considered in view of the required characteristics. For example, the thermal expansion coefficient of the aluminum titanate is decreased depending upon the increase of degree of the firing. The thermal expansion coefficient and the strength are inferior when the substrate has high porosity and low degree of the firing.

In the present invention, this problem is dissolved by the selection of aluminum titanate and the incorporation of $SiO_2$ component and the extrusion molding method.

It has been known that a desired strength of aluminum titanate is not imparted without sintering and the incorporation of $SiO_2$ component is effective for the sintering, however, it has not been considered to prepare a ceramic honeycomb by using aluminum titanate and to incorporation of the $SiO_2$ component for producing a product which can be practically used. Aluminum titanate has not been considered as a material for practical uses because of unstable at high temperature. In the present invention, it has been succeeded to provide a ceramic honeycomb having the above-mentioned characteristics by the incorporation of the $SiO_2$ component.

The amount of the $SiO_2$ component for the ceramic honeycomb of the present invention is preferably in a range of 4 to 10 wt. % especially 5 to 8 wt. % as the chemical composition of the fired ceramic honeycomb. When the amount of the $SiO_2$ component is not enough, the strength is inferior whereas when it is too much, the thermal expansion coefficient is too high. The characteristics of the ceramic honeycomb can be imparted in said range.

The physical characteristics of the ceramic honeycomb of the present invention will be described later in detail.

Now, the preparation of the ceramic honeycomb having such characteristics especially the desired preparation with the incorporation of the $SiO_2$ component will be described.

The desired process of the present invention is to prepare the multicellular monolithic ceramic body as the ceramic honeycomb by fabricating a multicellular monolithic body having many gas passages partitioned by thin walls in an extruding direction by extruding a ceramic plastic composition comprising aluminum titanate or an aluminum titanate precursor as a major constituent through a die for extruding in a form of the multicellular body; calcining the resulting fabricated composition to obtain said multicellular monolithic ceramic body made of aluminum titanate as a major constituent of the ceramic composition and having characteristics of less than 0.15% of a thermal expansion coefficient at 1000° C. and more than 350 kg./cm² of a compressive strength as zero of an open frontal area as the characteristics in the direction of extrusion and more than 35% of a porosity.

The ceramic plastic composition is a mixture of refractory materials comprising a synthesized aluminum titanate or an aluminum titanate precursor which is convertible to aluminum titanate by firing after fabricating to the honeycomb, as the major constituent and is an extrudable composition for extruding through a die for extrusion molding. In order to impart such extrudable fluidity as plastic property, it is possible to use a viscosity regulator of an organic macromolecular compound such as methylcellulose and starch or a mixture of clay and water. It is also possible to use a composition of a resin such as polystyrene or polyethylene or a mixture of two or more resins which is used for an injection molding.

The incorporation of clay is desirable in view of higher strength of the ceramic honeycomb.

In order to decrease the thermal expansion coefficient of the fired ceramic honeycomb, it is indispensable to impart certain sintering for the ceramic plastic composition with certain firing contraction. In order to obtain the sintered product having a porosity of about 35 to 45% and low thermal expansion coefficient and high strength it is necessary to incorporate a porosity increasing additive (to form pores by firing).

As the sintering additive, the $SiO_2$ component for imparting high strength is incorporated in the ceramic plastic composition. It is optimum to incorporate clay in view of the plastic property. It is also possible to incorporate the other oxides such as $Fe_2O_3$, $Cr_2O_3$ and $SnO_2$ which are also effective for reducing the decomposition of aluminum titanate at high temperature. It is usually effective to incorporate $Y_2O_3$, $La_2O_3$ or $CeO_2$ at a ratio of about 0.5 to 5 wt. % based on aluminum titanate.

The thermal expansion coefficient of aluminum titanate is reduced depending upon the increase of the degree of sintering. The product having high porosity and low sintered state has high thermal expansion coefficient and low strength. It has been found that the incorporation of $Y_2O_3$, $La_2O_3$ or $CeO_2$ component with the $SiO_2$ component in the composition is effective to overcome the problem.

These components can be used as the sintering additive and also as the high temperature stabilizer for reducing decomposition of aluminum titanate at high temperature and as the component for increasing strength at high temperature, with synergistic effect with the $SiO_2$ component.

It is advantageous to incorporate all of the sintering additive in the synthesis of aluminum titanate though it is possible to add to the ceramic plastic composition for fabricating the honeycomb as the incorporation of the $SiO_2$ component.

The sintering additive is usually incorporated in a form of an oxide. It is possible to incorporate it in a form of a precursor which is converted to the oxide by firing.

The sintering additive will be further illustrated. It is optimum to use $La_2O_3$ which imparts excellent effect for strength of the fired product with the $SiO_2$ component and also imparts synergistic effect for the stability at high temperature with the $SiO_2$ component. The pure aluminum titanate honeycomb has fatal defect in view of the stability at high temperature and accordingly it could not be considered to use it in an industrial purpose. That is, $Al_2O_3.TiO_2$ is decomposed to $Al_2O_3$ and $TiO_2$ in an oxidative atmosphere at 900° C. to 1350° C. whereby the characteristics of low thermal expansion and high strength are lost. The tendency for the decomposition is especially remarkable in a reducing atmosphere. In order to overcome these disadvantages, various studies have been made to succeed in the improvement of the stability at high temperature with low thermal expansion of the aluminum titanate honeycomb by the incorporation of the $SiO_2$ component and the $La_2O_3$ component. The same effect can be imparted by using $Y_2O_3$ or $CeO_2$ instead of $La_2O_3$. The mixture thereof can be also used.

The optimum amount of the specific additive is in a range of 0.5 to 2 wt. % in the fired composition. When it is less than 0.5 wt. %, the effect is not enough whereas it is unnecessary to incorporate more than 2 wt. % of the specific additive. The amount of the specific additive can be decreased by the incorporation of the $Fe_2O_3$ component. There is possibility to cause disadvantage of increase of the thermal expansion and decrease of the melting point by the incorporation of more than 2 wt. % of the specific additive.

The incorporation of the $Fe_2O_3$ component will be described. The incorporation of the $Fe_2O_3$ component is effective as the sintering additive and also effective for imparting synergistic effect as the high temperature stabilizer with $SiO_2$, $La_2O_3$, etc. in an oxidative atmosphere. On the contrary, the incorporation of the $Fe_2O_3$ component results in acceleration of the decomposition in the reducing atmosphere. Therefore, it is effective depending upon the condition. The amount of the $Fe_2O_3$ component in such condition is preferably more than 0.4 wt. % to give a total amount of $Fe_2O_3$, $La_2O_3$, $CeO_2$ and $Y_2O_3$ of 0.9 to 5 wt. %.

When the $Fe_2O_3$ component is not incorporated (especially in the use of the product in the reducing atmosphere), it is possible to incorporate more than 2 wt. % of $La_2O_3$, $CeO_2$ or $Y_2O_3$ component. When it is more than 5 wt. %, the cost increases without any improvement of the characteristics. Sometimes it causes to increase the thermal expansion.

The porosity increasing additive can be incorporated in the ceramic plastic composition. A binder such as methylcellulose and polystyrene; and coke powder, and also cellulose powder can be used as the porosity increasing additive.

The sintering additive and the porosity increasing additive can be added in the synthesis of aluminum titanate. The thermal decomposition inhibitor is preferably incorporated in the synthesis of aluminum titanate.

The refractory material as the major constituent of the ceramic plastic composition will be illustrated. Alumina ($Al_2O_3$) source and titania ($TiO_2$) source for the formation of aluminum titanate are used. It is preferable to incorporate the synthesized aluminum titanate as all or most of the major constituent of the ceramic plastic composition.

The synthesis of aluminum titanate will be illustrated. The aluminum titanate is produced by preparing a mixture of the alumina source, the titania source the sintering additive, the thermal decomposition inhibitor and a binder and fabricating it and firing it. It is optimum to use aluminum hydroxide which is converted to alumina by firing as the alumina source. The use of aluminum hydroxide is advantageous in view of the cost, the purity and the easy synthesis and also the preparation of the ceramic honeycomb having excellent physical characteristics.

As a titania source, anatase type synthesized $TiO_2$ is usual used, though rutile type $TiO_2$ can be used.

The molar ratio of $Al_2O_3$ to $TiO_2$ is preferably in a range of 1.00:1.00 to 0.80:1.20 as the theoretical composition. When, the content of $Al_2O_3$ is more than the range, the sintering is not easily resulted and the thermal expansion coefficient is too high and the stability at high temperature is inferior whereas when the content of $TiO_2$ is more than the range, the thermal expansion coefficient is too high. The desired stability at high temperature is given in said range.

It is necessary to incorporate the $SiO_2$ component for sintering the aluminum titanate which is obtained from the sources or synthesized. When the amount of the $SiO_2$ component and the method of the incorporation are considered as described, the effect of the invention is especially advantageous.

The amount of the $SiO_2$ component in the fired ceramic honeycomb is preferably in a range of 4 to 10 wt. %. A part of the $SiO_2$ component as 10 to 60% is preferably incorporated in the sources for the synthesis of the aluminum titanate used as the refractory material in the ceramic plastic composition.

The $SiO_2$ component is usually incorporated for 10 to 60% of the total $SiO_2$ component in the synthesis of the aluminum titanate and for 90 to 40% in the preparation of the ceramic plastic composition whereby the ceramic honeycomb having excellent characteristics can be effectively attained. Moreover, it has been found to impart the optimum effect for the strength of the fired product.

When a firing temperature for producing the aluminum titanate clinker is too high, the thermal expansion coefficient of the fired ceramic honeycomb is increased though the thermal expansion coefficient of the clinker is not affected. When it is too low, the aluminum titanate is not satisfactorily produced. It is preferably in a range of 1450° to 1600° C. especially 1500° to 1550° C.

The resulting aluminum titanate clinker is preferably used by pulverizing to be fine powder as the refractory source. In the present invention, it is preferable to use it in a form of powder having more than 80% of fine powder passing through 300 mesh sieve. When it is the fine powder, it is advantageous in the stable extrusion molding for a honeycomb having thin walls (for example, 0.15 to 0.2 mm).

The ceramic plastic composition is fed into the conventional extruding machine to fabricate the composition into the honeycomb shape. The ratio of the refractory source in the ceramic plastic composition is preferably to give more than 85 wt. % of aluminum titanate component and 4 to 10 wt. % of $SiO_2$ component and less than 10 wt. % preferably less than 6 wt. % of the other components as the chemical composition of the fired ceramic honeycomb.

As the ratio of the refractory source in the ceramic plastic composition, it is preferable to give 85 to 95 wt. % of the synthesized aluminum titanate, 15 to 5 wt. % of clay especially 90 to 95 wt. % of the former and 10 and 5 wt. % of the latter.

The extrusion machine can be a die disclosed in U.S. Pat. No. 3,038,201 and Japanese Unexamined Patent Publication No. 42386/1972 or can be the conventional extrusion machine. The honeycomb obtained by extrusion-molding by such extrusion machine has low thermal expansion coefficient in the direction of the extrusion and has high thermal shock resistance.

The shapes of the ceramic honeycomb can be considered depending upon the applications. In the application for the automotive emission control, it is usual to form many gas passages having cross-sectional view of square or other desired shape as disclosed in U.S. Pat. No. 3,899,326, No. 3,853,485, and No. 3,983,283.

The honeycomb fabricated by the extrusion machine is dried and fired. The temperature for firing is in a range of 1350° to 1500° C. preferably 1380° to 1450° C. When the temperature is too high, the porosity required for the ceramic honeycomb used for the catalyst carrier is decreased. When the temperature is too low, the thermal expansion coefficient is not decreased.

In accordance with the process of the present invention, the fired ceramic honeycomb made of aluminum titanate having excellent characteristics for honeycomb which could not be previously provided. The physical characteristics will be illustrated.

The ceramic honeycomb comprises more than 85 wt. % of aluminum titanate component to have the melting point higher than that of the conventional cordierite honeycomb, whereby it is durable in the continuous use at higher than 1400° C. and it is durable at about 1650° C. for a short time. This is superior to the safety temperature of the cordierite honeycomb of upon to 1300° C.

The thermal expansion coefficient in the direction of the gas passages can be less than 0.15% at 1000° C. This is similar to the minimum thermal expansion coefficient of the cordierite honeycomb of 0.12%. It is possible to give less than 0.1% or less than 0.09% of the thermal expansion coefficient if desired. These characteristics are enough to be durable to severe repeated uses as the automotive emission control honeycomb.

At the characteristics of the fired ceramic honeycomb the ceramic honeycomb made of the aluminum titanate of the present invention has more than 35% of a porosity which is enough to carry a catalyst together with more than 350 kg./cm$^2$ of a compressive strength (as zero of an open frontal area in the gas flow direction) as the special characteristics of high heat resistance and high thermal shock resistance superior to those of the cordierite honeycomb. It has been difficult to impart both characteristics.

When the porosity is too high, it is natural to decrease the strength lower than the required level. It is preferable to be up to 45% of the porosity except an improvement for holding by an automobile to be capable of low strength or an application which does not require high strength.

The structure of the ceramic honeycomb having many gas passages partitioned by thin walls which has the above-mentioned characteristics can be the following ranges.

A thickness of the thin wall is in a range of 0.08 to 0.5 mm; a density of holes as the gas passages of 40 to 200 per 1 cm$^2$ and an open frontal area (perpendicular to the gas flow direction) of 50 to 85%.

These characteristics are not inferior to the characteristics of the conventional honeycombs whose strength is lower in the use at 800° to 1000° C. whereas the ceramic honeycomb of the present invention made of aluminum titanate has the strength at such temperature higher than the strength at room temperature. The high temperature and thermal spalling durability in the use of the ceramic honeycomb of the present invention is remarkably higher than the durability of the cordierite honeycomb.

In accordance with the present invention, the ceramic honeycomb having excellent characteristics of high heat resistance, high porosity, high compressive strength and low thermal expansion, which are important for a ceramic honeycomb for catalyst carrier but could not be given by the conventional technology. The practical value of the ceramic honeycomb is remarkable.

The present invention will be further illustrated by certain examples and references which are provided for purposes of illustration only and are not intended to be limiting the present invention.

EXAMPLE 1

Aluminum hydroxide synthesized anatase $TiO_2$, clay, ferric oxide, yttrium oxide, methylcellulose and water were mixed and kneaded and molded in a form of rough rod having a diameter of 60 mm. The molded composition was dried and fired at 1550° C. for 5 hours to obtain a synthetic aluminum titanate clinker comprising 3 wt. % of $SiO_2$, 2 wt. % of $Fe_2O_3$, 1 wt. % of $Y_2O_3$ and the remainder of $Al_2O_3.TiO_2$. The synthetic clinker was pulverized to pass through 300 mesh sieve to use it as the synthetic aluminum titanate (referring to as Aluminum titanate source I).

100 Wt. parts of the refractory source of 92 wt. % of the Aluminum titanate source I and 8 wt. % of clay was admixed with 10 wt. parts cellulose powder, and 5 wt. parts of methylcellulose and water to prepare a ceramic plastic composition. The composition was extruded through a die for honeycomb extrusion molding to form a honeycomb having many gas passages having square cross sectional view which are partitioned by thin walls.

The molded composition was fired at the maximum temperature of 1400° C. to obtain the ceramic honeycomb having the following properties.

Composition of ceramic honeycomb $Al_2O_3.TiO_2$ of 89.0 wt. %
$SiO_2$ of 6.5 wt. %
$Fe_2O_3$ of 2.0 wt. %
$Y_2O_3$ of 1.0 wt. %
the others of 0.5 wt. %

Characteristics

Porosity of 38%

Thermal expansion coefficient of 0.08% (extruding direction at 1000° C.)

Compressive strength of 445 kg./cm$^2$ (extruding direction) (120 kg./cm$^2$ in an open frontal area of 73%)

Heat resistance (*Note 1) of higher than 1600° C.

Thermal shock resistance (*Note 2) of higher than 900° C.

*Note 1: A regular hexahedron honeycomb having each side of 2 cm was kept in a furnace at a specific temperature for three minutes and the temperature for no deformation was measured.
*Note 2: The temperature of a furnace was elevated each 100° C. to flush heat the sample at a specific temperature and an operation for 1 cycle of heating in furnace ⇌ cooling in air was repeated for three times to carry out the thermal spalling test for temperature difference. The temperature for no damage was measured.

Structure of ceramic honeycomb

Thickness of wall of 0.15 mm
Density of holes as gas passages of 95/cm$^2$
Open frontal area of 73%.

It is understood that the ceramic honeycomb having such characteristics can be practically used as a catalyst carrier for automotive emission control, in view of the following characteristics of the typical cordierite honeycomb which is commercialized and practically used.

Porosity of 32%

Thermal expansion coefficient of 0.18% (1000° C.)

Compressive strength of 450 kg./cm$^2$ (121 kg./cm$^2$ in an open frontal area of 73%)

Heat resistance (See Note 1) of lower than 1400° C.

Thermal shock resistance (See Note 2) of lower than 600° C.

EXAMPLE 2

In the preparation of Aluminum titanate source I in Example 1, excess of clay was incorporated to give 6.5 wt. % of $SiO_2$ component. This is referred to as Aluminum titanate source Ia.

100 Wt. parts of Aluminum titanate source Ia was admixed with 5 wt. parts of methylcellulose, 10 wt. parts of cellulose powder and water without any clay to prepare a ceramic plastic composition. In accordance with the process of Example 1 except using the ceramic plastic composition, a fired ceramic honeycomb was prepared.

The resulting ceramic honeycomb had similar characteristics to those of Example 1 except having relatively lower compressive strength of about 350 kg./cm$^2$. This product can be used for certain purposes though the condition for the application is limited.

EXAMPLE 3

In accordance with the process of Example 1 except using 10 wt. parts of polystyrene and 5 wt. parts of polyethylene instead of methylcellulose without water, to prepare a ceramic plastic composition and a honeycomb was extruded at 160° C. and dipped in methylenechloride for 15 minutes after cooling to remove polystyrene, a ceramic honeycomb was obtained by firing it. The characteristics of the product are as follows.

Porosity of 36%

Thermal expansion coefficient of 0.07% (extruding direction at 1000° C.)

Compressive strength of 400 kg./cm$^2$ (extending strength: 108 kg./cm$^2$ in an open frontal area of 73%)

Heat resistance of higher than 1600° C.

Thermal shock resistance of higher than 900° C.

REFERENCE 1

In accordance with the process of Example 1 except that excess of clay was incorporated in Aluminum titanate source Ia ceramic honeycomb having 12 wt. % of $SiO_2$ component was prepared by firing the ceramic plastic composition. The ceramic honeycomb had a thermal expansion coefficient of 0.22% at 1000° C. which is out of the range of the present invention. In the shock test at high temperature described in Note 1, several cracks were formed to fall apart.

REFERENCE 2

In the preparation of Aluminum titanate source I, $SiO_2$ component was not incorporated to prepare Aluminum titanate source Ib.

In accordance with the process of Example 1 except using Aluminum titanate source Ib to prepare the ceramic plastic composition, a fired ceramic honeycomb containing 3 wt. % of $SiO_2$ component was obtained.

The ceramic honeycomb had a desired thermal expansion of 0.05% at 1000° C. but low compressive strength of about 150 kg./cm$^2$ which is out of the range of the present invention.

REFERENCE 3

In accordance with the process of Example 1 except firing a molded honeycomb composition at 1320° C., a ceramic honeycomb was prepared. The ceramic honeycomb had a porosity of about 45% but had fluctuated strengths and thermal expansion coefficient of a half of the products were about 0.20% at 1,000° C. The firing at this temperature is not preferable.

EXAMPLE 4

In accordance with the process of Example 1 except using alumina powder ($\alpha$-$Al_2O_3$ crystal grains of about $3\mu$) was used instead of aluminum hydroxide, a fired ceramic honeycomb was obtained.

The ceramic honeycomb had a porosity of 40%, a thermal expansion coefficient of 0.14% (at 1000° C.) and a compressive strength of 380 kg./cm$^2$ (102 kg./cm$^2$ at an open frontal area of 73%).

EXAMPLE 5

60 Wt. parts of Aluminum titanate source I of Example 1 was admixed with 29 wt. parts of a mixture of alumina and anatase type titania powder (which form aluminum titanate in firing after the molding of the honeycomb), and 10 wt. parts of clay, 0.7 wt. parts of ferric oxide, and 0.3 wt. parts of $Y_2O_3$. 100 Wt. parts of the mixture was admixed with cellulose powder, methylcellulose and water and the mixture was kneaded to prepare a ceramic plastic composition. In accordance with the process of Example 1, a ceramic honeycomb was prepared from the composition.

The resulting ceramic honeycomb had a porosity of 36%, a thermal expansion efficiency of 0.13% (at 1000° C.) and a compressive strength of 450 kg./cm$^2$ (122 kg./cm$^2$ at an open frontal area of 73%).

REFERENCE 4

In accordance with the process of Example 1 except firing the composition for Aluminum titanate source at 1650° C., a ceramic honeycomb was prepared. The ceramic honeycomb had a porosity of 40%, a compressive strength of 370 kg./cm$^2$ (100 kg./cm$^2$ in an open frontal area of 73%), but had large thermal expansion coefficient of 0.25% (at 1000° C.) which is out of the range of the present invention.

EXAMPLE 6

In accordance with the process of Example 1 except that 1.5 wt. % of $La_2O_3$ was used instead of $Y_2O_3$, a fired ceramic honeycomb was prepared.

The ceramic honeycomb had a porosity of 37%, a thermal expansion coefficient of 0.05% (at 1000° C.) and a compressive strength of 460 kg./cm$^2$ (125 kg./cm$^2$ in an open frontal area of 73%).

EXAMPLE 7

In accordance with the process of Example 1 except that 1.0 wt. % of $CeO_2$ was used instead of $Y_2O_3$, a fired ceramic honeycomb was prepared.

The ceramic honeycomb had a porosity of 41%, a thermal expansion coefficient of 0.13% (at 1000° C.) a compressive strength of 370 kg./cm$^2$ (90 kg./cm$^2$ in an open frontal area of 73%).

EXAMPLE 8

In accordance with the process of Example 1 except that ferric oxide was not used to prepare Aluminum titanate source Ic and 100 wt. parts of a refractory material comprising 90 wt. % of Aluminum titanate source I' and 10 wt. % of clay was used, a fired ceramic honeycomb was prepared. The ceramic honeycomb had a higher porosity of 43% but lower compressive strength of 390 kg./cm$^2$ and the similar other characteristics.

The high temperature stability of the ceramic honeycomb was uperior to that of Example 1 in an oxidative atmosphere but was slightly inferior to that of Example 1 in a reducing atmosphere. These are acceptable in the practical uses.

The product was heated at 1000° C. in an atmosphere of 1% of CO and 99% of N$_2$ for 10 hours and the heat-treatment was repeated for 5 times.

According to X-ray analysis, a decomposition of aluminum titanate for about 3% was found in the case of Example 1 whereas no decomposition was found and no adverse effect to the appearance and the thermal expansion coefficient was found in the case of Example 8.

The product was heated at 1000° C. in air for 1000 hours.

No decomposition was found in the case of Example 8 whereas a decomposition of aluminum titanate for about 4% was found in the case of Example 1.

We claim:

1. A multicellular monolithic ceramic body having many gas passages partitioned by thin walls, consisting essentially of: aluminum titanate as the major constituent and from 4 to 10 wt. % SiO$_2$, said ceramic body having a thermal expansion coefficient less than 0.15% at 1000° C., a compressive strength greater than 350 kg/cm$^2$ as taken along the direction of the gas passages based only on the solid surface of said body and not including open areas of said body and a porosity of greater than 35%.

2. The multicellular monolithic ceramic body of claim 1, wherein said porosity is less than 45%.

3. The multicellular monolithic ceramic body of claim 1, wherein said thermal expansion coefficient is less than 0.1.

4. The multicellular monolithic ceramic body of claim 1, wherein said ceramic consists essentially of more than 85 wt. % of aluminum titanate component in the chemical composition.

5. The multicellular monolithic ceramic body of claim 1, wherein said ceramic consists essentially of 5 to 8 wt. % of SiO$_2$ component.

6. The multicellular monolithic ceramic body of claims 1, 2, 3, 4 or 5, wherein the thickness of said thin walls partitioning said gas passages of the fired body is in the range of 0.08 to 0.5 mm, the frequency of the holes as the gas passages numbers from 40 to 200 per cm$^2$ and the open frontal area of the ceramic ranges from 50 to 85%.

7. The multicellular monolithic ceramic body of claims 1, 2, 3, 4 or 5, wherein the molar ratio of Al$_2$O$_3$ to TiO$_2$ as the components of aluminum titanate is in a range of 1.00:1.00 to 0.8:1.2.

8. The multicellular monolithic ceramic body of claim 1, wherein the chemical composition of said fired body consists essentially of more than 80 wt. % of aluminum titanate, 4 to 10 wt. % of SiO$_2$ and 0.5 to 5 wt. % of at least one oxide selected from the group consisting of La$_2$O$_3$, CeO$_2$ and Y$_2$O$_3$.

9. The multicellular monolithic ceramic body of claim 8, wherein the chemical composition of said fired body further consists essentially of more than 0.4 wt. % of Fe$_2$O$_3$ and 0.9 to 5 wt. % of at least one oxide selected from the group consisting of La$_2$O$_3$, CeO$_2$ and Y$_2$O$_3$ including Fe$_2$O$_3$.

10. The multicellular monolithic ceramic body of claim 8 or 9, wherein the chemical composition consists essentially of more than 85 wt. % of aluminum titanate and 4 to 10 % of SiO$_2$.

11. The multicellular monolithic ceramic body of claim 10, which further consists essentially of 0.5 to 2 wt. % of at least one of La$_2$O$_3$, CeO$_2$ and Y$_2$O$_3$.

12. A process for preparing a multicellular monolithic ceramic body having many gas passages therein, partitioned by thin walls, comprising:
   (a) extruding a plastic ceramic composition comprising aluminum titanate or an aluminum titanate precursor as the principal constituent and from 4% to 10% by wt. of SiO$_2$ based on the metal oxide components of the composition through an extruding dye; and
   (b) calcining the extruded mass at a temperature of 1350° to 1500° C., thereby obtaining said ceramic body having a thermal expansion coefficient less than 0.15% at 1000° C., a compressive strength greater than 350 kg/cm$^2$ as taken along the direction of the gas passages based only on the solid surface of said body and not including open areas of said body and a porosity of greater than 35%.

13. The process according to claim 12, wherein said ceramic is based upon 85% to 95% by wt. aluminum titanate.

14. The process of claim 12, wherein the refractory materials of said plastic ceramic composition consist essentially of from 85 to 95 wt. % of aluminum titanate, 15 to 5 wt. % of clay and less than 10 wt. % of the other components.

15. The process of claim 14, wherein said refractory materials contain from 0.5 to 5 wt. % of at least one metal oxide selected from the group consisting of La$_2$O$_3$, CeO$_2$ and Y$_2$O$_2$.

16. The process of claim 15, wherein said refractory materials further consist essentially of more than 0.4 wt. % of Fe$_2$O$_3$ component and 0.9 to 5 wt.% of at least one metal oxide selected from the group consisting of La$_2$O$_3$, CeO$_2$ and Y$_2$O$_3$ components including Fe$_2$O$_3$ among the lanthanum oxide materials.

17. The process of claim 12, wherein the aluminum titanate contains 10 to 60 wt. % of SiO$_2$ based on the total SiO$_2$ components in the fired ceramic body.

18. The process of claim 12, wherein the aluminum titanate comprises more than 80% of fine powder passing through 300 mesh.

19. The process of claim 18, wherein the aluminum titanate is produced by firing a mixture of a source of alumina and a source of titania as major constituents at 1450° to 1600° C.

20. The process of claim 19, wherein the alumina source is aluminum hydroxide.

* * * * *